United States Patent
Takuma et al.

(10) Patent No.: US 7,620,802 B2
(45) Date of Patent: Nov. 17, 2009

(54) INSTRUCTION EXECUTION DEVICE, DEBUGGING METHOD, DEBUGGING DEVICE, AND DEBUGGING PROGRAM

(75) Inventors: Akira Takuma, Osaka-fu (JP); Kohsaku Shibata, Osaka-fu (JP)

(73) Assignee: Panasonic Corporation, Osaka (JP)

( * ) Notice: Subject to any disclaimer, the term of this patent is extended or adjusted under 35 U.S.C. 154(b) by 569 days.

(21) Appl. No.: 11/440,253

(22) Filed: May 25, 2006

(65) Prior Publication Data
US 2007/0006158 A1  Jan. 4, 2007

(30) Foreign Application Priority Data
May 27, 2005  (JP) ............................. 2005-155902

(51) Int. Cl.
*G06F 11/36* (2006.01)
(52) U.S. Cl. ...................................... 712/227
(58) Field of Classification Search .................. 717/129
See application file for complete search history.

(56) References Cited

U.S. PATENT DOCUMENTS 5,361,354 A * 11/1994 Greyzck ..................... 717/160
5,771,385 A * 6/1998 Harper ........................ 717/128
6,553,565 B2 * 4/2003 Click et al. .................. 717/129
6,681,280 B1 * 1/2004 Miyake et al. .............. 710/261
6,922,826 B2 * 7/2005 Bates et al. .................. 717/129
2003/0033592 A1  2/2003 Tsubata et al.
2003/0208746 A1  11/2003 Bates et al.
2005/0216792 A1  9/2005 Tsuboi et al.

* cited by examiner

*Primary Examiner*—Eric Coleman
(74) *Attorney, Agent, or Firm*—McDermott Will & Emery LLP

(57) ABSTRACT

In executing debugging of an executable program in which a breakpoint is set at a conditional instruction using a software break technique, judgment of whether or not to stop the debugging is made, without use of a debugging device, in accordance with whether an execution condition expression of the conditional instruction is true or false. A processor capable of decoding and executing a program that includes conditional instructions executes debugging of the program. When a decoded instruction is a conditional break instruction (S201: YES, S202: YES), the processor identifies the type of the execution condition of the conditional break instruction (step S203), and refers to a status register to check a status flag of the execution condition (S204). If the execution condition is satisfied (S205: YES), the processor executes interrupt processing to suspend debugging (S206), and if the execution condition is not satisfied (S205: NO), the processor continues debugging.

3 Claims, 16 Drawing Sheets

FIG. 5

| 31 28 | 27 0 |
|---|---|
| cond | XXXXXXXXXXXXXXXXXXXXXXXXXXXX |

FIG. 6

| CONDITION | OPPOSITE CONDITION |
|---|---|
| ZERO | NZERO |
| CARRY | NCARRY |
| OVER | NOVER |

FIG. 7

| 31 28 | 27 0 |
|---|---|
| cond | 1111 1111 1111 1111 1111 1111 1111 |

FIG. 8

| 31 28 | 27 20 | 19 8 | 7 4 | 3 0 |
|---|---|---|---|---|
| 1110 | 00010010 | XXXXXXXXXXXX | 0111 | XXX |

FIG. 9

| 15 12 | 11 8 | 7 0 |
|---|---|---|
| XXXX | cond | XXXXXXXX |

FIG. 10

| 15 12 | 11 8 | 7 0 |
|---|---|---|
| 1111 | cond | 1111 1111 |

FIG. 11

| 15 8 | 7 0 |
|---|---|
| 10111110 | XXXXXXXX |

FIG. 15

| LINE NUMBER | STATEMENT |
|---|---|
| 10 | r=sub(1); |
| 11 | if(!r){ |
| 12 | r+=2; |
| 13 | } |

FIG. 16

| ADDRESS | CONDITION | MNEMONIC |
|---|---|---|
| 0x80000000 | | MOV R1, 1 |
| 0x80000004 | | CALL sub |
| 0x80000008 | [ZERO] | ADD R1, 2 |
| 0x8000000C | | MOV(SP+0x10), R1 |

FIG. 17

| ADDRESS | CONDITION | MNEMONIC |
|---|---|---|
| 0x80000000 | | MOV R1, 1 |
| 0x80000004 | | CALL sub |
| 0x80000008 | [ZERO] | BRK |
| 0x8000000C | | MOV(SP+0x10), R1 |

FIG. 22

| CONDITION | FLAG |
|---|---|
| ZERO | 0 |
| NZERO | 0 |
| CARRY | 0 |
| NCARRY | 0 |
| OVER | 0 |
| NOVER | 0 |

FIG. 23

| LINE NUMBER | STATEMENT |
|---|---|
| 10 | r=sub(1); |
| 11 | if(!r){ |
| 12 | return; |
| 13 | } |

FIG. 24

| ADDRESS | CONDITION | MNEMONIC |
|---|---|---|
| 0x80000000 | | MOV R1, 1 |
| 0x80000004 | | CALL sub |
| 0x80000008 | [ZERO] | RET |
| 0x8000000C | | MOV (SP+0x10), R1 |

FIG. 25

| ADDRESS | CONDITION | MNEMONIC |
|---|---|---|
| 0x80000000 | | MOV R1, 1 |
| 0x80000004 | | CALL sub |
| 0x80000008 | [ZERO] | BRK |
| 0x8000000C | | BRK |

INSTRUCTION EXECUTION DEVICE, DEBUGGING METHOD, DEBUGGING DEVICE, AND DEBUGGING PROGRAM

BACKGROUND OF THE INVENTION (1) Field of the Invention

The present invention relates to a debugging assistance technique, and in particular to a technique for setting a breakpoint in a program that includes conditional instructions, using a software break technique that is one debugging function.

(2) Description of the Related Art

Processors developed in recent years are capable of executing conditional instructions that specify an execution condition of the instruction to the instruction itself.

When debugging a program that is executable by a processor, a breakpoint may be set in the program using a software break technique. A software break technique is a technique of rewriting an instruction that is in a position set as a breakpoint into a break instruction (one type of debug instruction) for executing interruption processing. A breakpoint is an instruction position at which, during execution of the program that is the target of debugging, the program is suspended.

According to the software break technique, an arbitrary instruction in the instruction memory is rewritten into a break instruction, and the break instruction is executed by a processor that has a break instruction in its instruction set, an emulator that simulates the functions of the processor, and the like.

The processor, emulator and the like read the break instruction from the instruction memory, decode the read break instruction, and by executing the decoded break instruction, cause an interruption and suspend execution of the program.

However, when executing a program with a breakpoint set at a conditional instruction using a software break technique, if a break instruction is read, a conventional processor or the like causes an interruption and suspends execution of the program even if the execution condition specified by the break instruction is not satisfied.

Japanese Patent Application Publication No. H11-341077 discloses the following interruption control method as one way of solving the aforementioned problem. When the processor executes a break instruction and an interruption occurs, a debugging device judges whether or not the execution condition of a conditional instruction before the conditional instruction is rewritten into a break instruction is satisfied, and the processor recommences the execution of the program if the execution condition is judged not to have been satisfied.

There is a desire among those involved in program development to reduce the time taken for debugging, in order to increase efficiency.

However, with the described interruption control method, the debugging device intervenes each time execution of the program is stopped at a breakpoint. Since the intervention of the debugging device is one factor preventing reduction of the time taken for debugging, the described interruption control method does not sufficiently respond to the desires of those involved in program development.

SUMMARY OF THE INVENTION

In view of the stated problem, an object of the present invention is to provide an instruction execution device capable of reducing time taken for debugging of an executable program in which a breakpoint has been set at a conditional instruction using a software break technique, without intervention by a debugging device. A further object of the present invention is to provide a debugging method, a debugging device and a debugging apparatus for setting a breakpoint in a program that includes conditional instructions.

In order to achieve the stated objects, the present invention is an instruction execution device that executes instructions stored in a storage device, including: a storage unit operable to store a value that is an instruction execution result; an execution unit operable to execute a debug instruction that interrupts instruction execution; an identification unit operable to identify, from a bit sequence that constitutes the debug instruction, a conditional expression that uses, as an operand, the value stored in the storage unit; and a judgment unit operable to judge whether or not the identified conditional expression is true or false, by referring to the value stored in the storage unit, wherein the execution unit suppresses execution of the debug instruction when the conditional expression is judged to be false.

Here, the instruction execution device is, for instance, a processor, an emulator that emulates the processor, or a simulator that simulates operations of the processor.

The described instruction execution device judges whether or not to stop the debugging, without intervention of a debugging device, according to whether the execution condition expression of the conditional instruction is true or false. Therefore, compared to a conventional interruption control method, the time spent on debugging can be reduced, and debugging can be performed with increased efficiency.

In the described instruction execution apparatus, the debug instruction may be shorter in length than an instruction that is shortest in length among instructions in an instruction set of the instruction execution device.

According to the stated structure, erroneous overwriting of instructions that are not a target of rewriting can be avoided when setting a breakpoint using a software break technique.

A debugging method of the present invention sets a breakpoint in a program that can be decoded and executed by the aforementioned instruction execution device, the method including: judging whether or not an instruction at a position that has been set as the breakpoint is a conditional instruction; and when the instruction at the position that has been set as the breakpoint is judged to be a conditional instruction, rewriting the conditional instruction into a debug instruction that specifies an execution condition that is identical to an execution condition of the conditional instruction.

A debugging device of the present invention sets a breakpoint in a program that can be decoded and executed by the aforementioned instruction execution device, the debugging device including: a judgment unit operable to judge whether or not an instruction at a position that has been set as the breakpoint is a conditional instruction; and a rewriting unit operable to, when the instruction at the position that has been set as the breakpoint is judged to be a conditional instruction, rewrite the conditional instruction into a debug instruction that specifies an execution condition that is identical to an execution condition of the conditional instruction.

A debugging program of the present invention sets a breakpoint in a program that can be decoded and executed by the aforementioned instruction execution device, the debugging program including: a judgment step of judging whether or not an instruction at a position that has been set as the breakpoint is a conditional instruction; and a rewriting step of, when the instruction at the position that has been set as the breakpoint is judged to be a conditional instruction, rewriting the conditional instruction into a debug instruction that specifies an execution condition that is identical to an execution condition of the conditional instruction.

Each of the described debugging method, debugging device and debugging program rewrites a conditional instruction at a position set as a breakpoint into a debugging instruction having an execution condition identical to the execution condition of the conditional instruction. When the instruction execution apparatus executes debugging of the program to which the rewritten conditional instruction belongs, the instruction execution device determines, without intervention from an external source such as a debugging device, whether or not to execute interruption processing, according to whether the execution condition expression of the debugging instruction is true or false. Therefore, compared to a conventional interruption control method, the time spent on debugging can be reduced, and debugging can be performed with increased efficiency.

The described debugging method may further include: when the instruction at the position set as the breakpoint is judged to be a conditional instruction, judging, based on an instruction positioned before the conditional instruction, whether or not prediction is possible of whether or not the execution condition of the conditional instruction will be satisfied, and when it is judged that the prediction is not possible, notifying a user that the prediction is not possible.

According to the stated method, when it is unable to be predicted whether or not the execution condition of the conditional instruction at which a breakpoint is to be set will be satisfied, the user is notified that the prediction is not possible. Therefore, the user is able to re-set the breakpoint in consideration of this notification.

The described debugging method may further include: when the instruction at the position set as the breakpoint is judged to be a conditional instruction, judging, based on an instruction positioned before the conditional instruction, whether or not prediction is possible of whether or not the execution condition of the conditional instruction will be satisfied, when it is judged that the prediction is not possible, searching for an instruction that is closest to the conditional instruction, among one or more instructions that are positioned after the conditional instruction and are each one of (a) a second conditional instruction that has an execution condition that is different to the execution condition of the conditional instruction and (b) an unconditional instruction that does not have a condition, and setting a position of the instruction found as a result of the search as a reserve breakpoint.

According to the stated method, in addition to the position of the conditional instruction that is to be a breakpoint, positions of one or more searched instructions are also set as breakpoints. Therefore, in debugging of the program in which breakpoints have been set, even if the debugging execution is not stopped at the position of the conditional instruction that is to be the breakpoint, the debugging can be stopped at the position of a subsequent searched instruction.

The described debugging method may further include: when the instruction at the position set as the breakpoint is judged to be a conditional instruction, searching for one or more instructions that are positioned after the conditional instruction and are each one of (a) a conditional instruction that has any one of a plurality of conditions and (b) an unconditional instruction that does not have a condition, and setting each position of the one or more instructions found as a result of the search as breakpoint candidate positions.

According to the stated method, in addition to the position of the conditional instruction that is to be a breakpoint, positions of one or more searched instructions are also set as breakpoints. Therefore, in debugging of the program in which breakpoints have been set, even if the debugging execution is not stopped at the position of the conditional instruction that is to be the breakpoint, the debugging can be stopped at the position of a subsequent searched instruction.

The described debugging method may further include: when the instruction at the position that has been set as the breakpoint is a conditional instruction in a sub-routine, judging whether or not a search position in the search is an end position of the sub-routine, and when the search position is judged to be the end position of the sub-routine, ending the search.

According to the stated method, when a position of a conditional instruction in a sub-routine is set as a breakpoint, and a position of an instruction other than the conditional instruction is set as a breakpoint, searching can be performed for an instruction position to be set as a breakpoint within a range that does not exceed the boundary of the sub-routine.

The described debugging method may further include: judging whether or not an execution condition of a conditional instruction at a search position in the search is an opposite condition to an execution condition of a conditional instruction previously found in the search, and when the execution condition of the conditional instruction at the search position is the opposite condition to the execution condition of the previously-found conditional instruction, ending the search.

According to the stated method, the position of a conditional instruction that specifies a particular execution condition and the position of a conditional instruction having an execution condition opposite to the particular execution condition are both set as breakpoints, in order to ensure that debugging is stopped. This means that if a conditional instruction that specifies a particular execution condition and a conditional instruction having an execution condition opposite to the particular execution condition can be found, the searching can end. Therefore, superfluous search processing can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 5 shows a 32-bit instruction format of a processor of FIG. 4;

FIG. 6 shows the relationship between execution conditions;

FIG. 7 shows a 32-bit break instruction format of the processor of FIG. 4;

FIG. 8 shows a break instruction format in ARM code of an ARM processor;

FIG. 9 shows a 16-bit extension instruction format of the processor of FIG. 4;

FIG. 10 shows a 16-bit break instruction format corresponding to extension instructions of the processor of FIG. 4;

FIG. 11 shows a break instruction format in a Thumb code of an ARM processor;

FIG. 15 shows part of a source program;

FIG. 16 shows part of debugging information corresponding to the source program of FIG. 15;

FIG. 17 shows part of debugging information in which a breakpoint has been set;

FIG. 22 shows a condition search table;

FIG. 23 shows part of a source program;

FIG. 24 shows part of debugging information corresponding to the source program of FIG. 23; and FIG. 25 shows part of debugging information in which a breakpoint has been set.

DESCRIPTION OF THE PREFERRED EMBODIMENTS

The following describes an embodiment of the present invention with reference to the drawings.

Structure

Overall Structure

Figure 1:
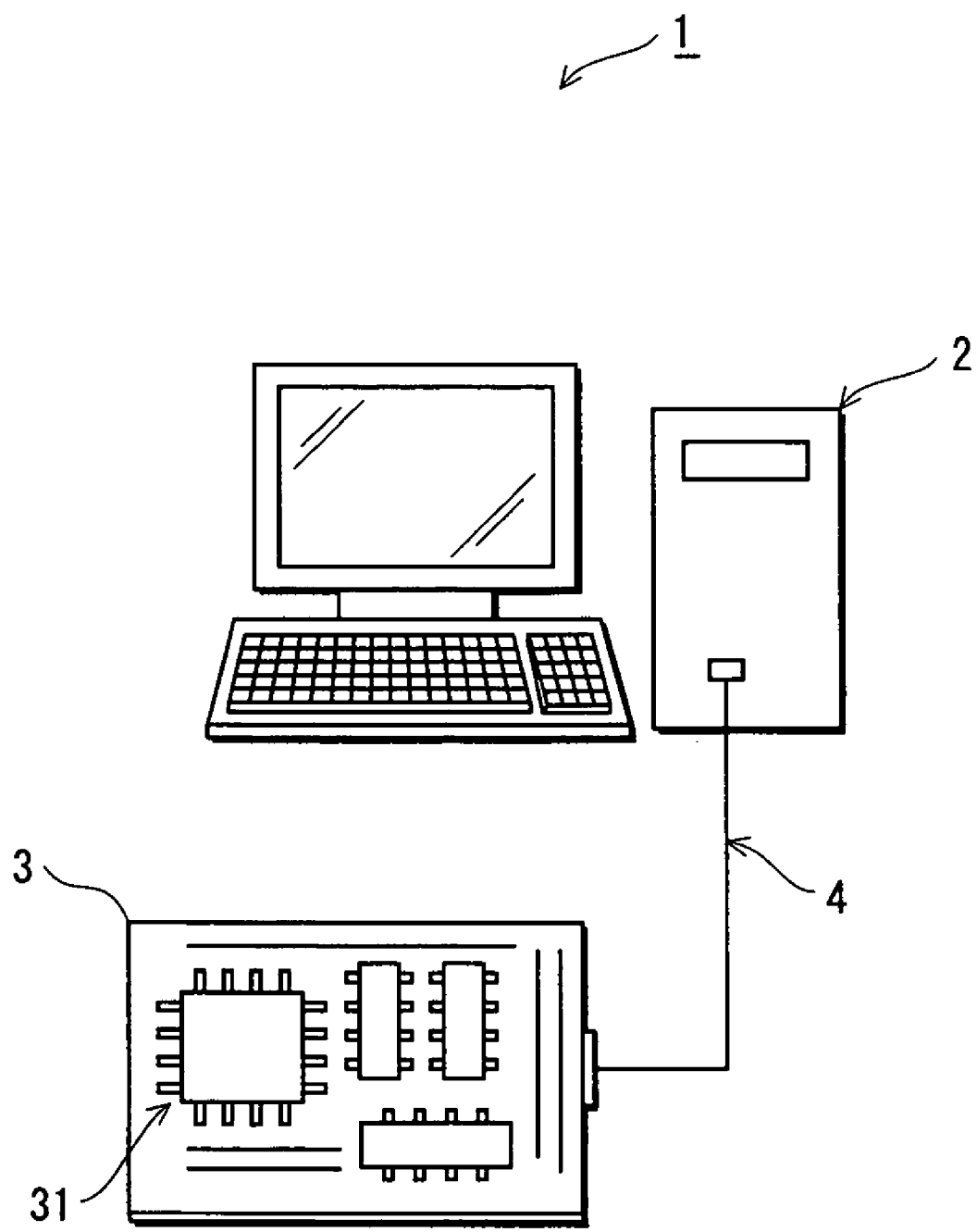
FIG. 1 is a structural drawing showing the overall structure of a debugging assistance system of an embodiment of the present invention.

The following describes the overall structure of a debugging assistance system of an embodiment of the present invention with reference to FIG. 1. FIG. 1 is a structural drawing showing the overall structure of the debugging assistance system of the present embodiment.

A debugging assistance system 1 is composed of a host computer 2, an evaluation board 3 and a connection cable 4, the host computer 2 and the evaluation board 3 being connected by the connection cable 4.

A processor in the host computer 2 has a function of setting a breakpoint in an executable program that is a target of debugging with a software break technique. The processor sets the breakpoint either in accordance with a user instruction or automatically. When setting the breakpoint, if the position of a conditional instruction in the executable program is set as a breakpoint, the processor rewrites the conditional instruction at the set position into a conditional break instruction whose execution condition is the execution condition of the conditional instruction.

In accordance with an instruction from the user to execute debugging, the processor in the host computer 2 causes a processor 31 in the evaluation board 3 to execute debugging of an executable program that has a breakpoint set therein.

The processor 31 that executes the executable program that is the target of debugging is installed in the evaluation board 3.

Upon reading a conditional break instruction during debugging of the executable program, the processor 31 judges whether the execution conditional expression of the conditional break instruction is true or false. The processor 31 executes interruption processing and suspends debugging if the execution conditional expression is judged to be true, and continues debugging if the execution conditional expression is judged to be false.

Structure of Host Computer 2

Figure 2:
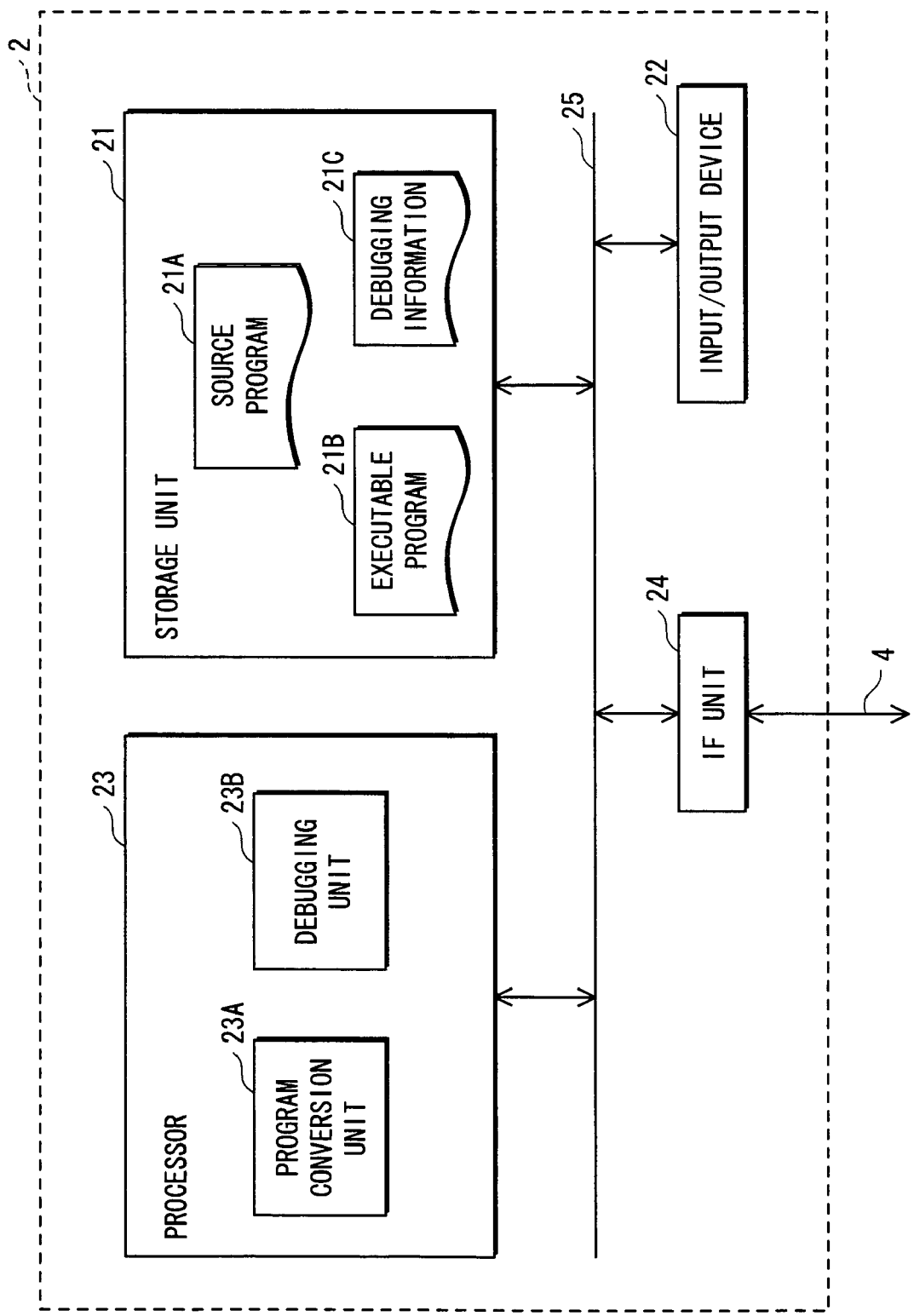
FIG. 2 is a structural drawing showing the structure of a host computer of FIG. 1.

The following describes the structure of the host computer 2 of FIG. 1 with reference to FIG. 2. FIG. 2 is a structural drawing showing the structure of the host computer 2 of FIG. 1.

The host computer 2 is composed of a storage unit 21, an input/output device 22, a processor 23, an IF (interface) unit 24, and a bus 25.

The storage unit 21 stores therein various control programs and other software. The storage unit 21 also stores therein a source program 21A, an executable program 21B, and debugging information 21C.

The input/output device 22 is composed of input devices and output devices, the input devices being a keyboard, a pointing device and the like, and the output devices being a display, a speaker and the like.

The processor 23 functions as a program conversion unit 23A, a debugging unit 23B, and so on.

According to a signal from the input/output device 22, the program conversion unit 23A converts a source program stored in the storage unit 21 into an executable program that is in a format the can be executed by a computer, and stores the executable program in the storage unit 21. When converting the source program to an executable program 21B, the program conversion unit 23A generates debugging information that expresses the executable program mnemonically, and stores the debugging information in the storage unit 21.

The debugging unit 23B refers to the source program, the executable program, and the debugging information in the storage unit 21, to set a breakpoint in the executable program. When setting the breakpoint, the debugging unit 23B performs instruction rewriting processing. This instruction rewriting processing includes processing for, if the instruction at the position set as the breakpoint is a conditional instruction, rewriting the conditional instruction into a conditional break instruction whose execution condition is the execution condition of the conditional instruction.

The debugging unit 23B also performs other processing relating to debugging assistance, such as processing to cause the processor 31 in the evaluation board 3 to execute the executable program in which a breakpoint has been set.

The IF unit 24 has a function of acting as an intermediary for signals transmitted between the host computer 2 and the evaluation board 3.

Debugging Unit 23B

Figure 3:
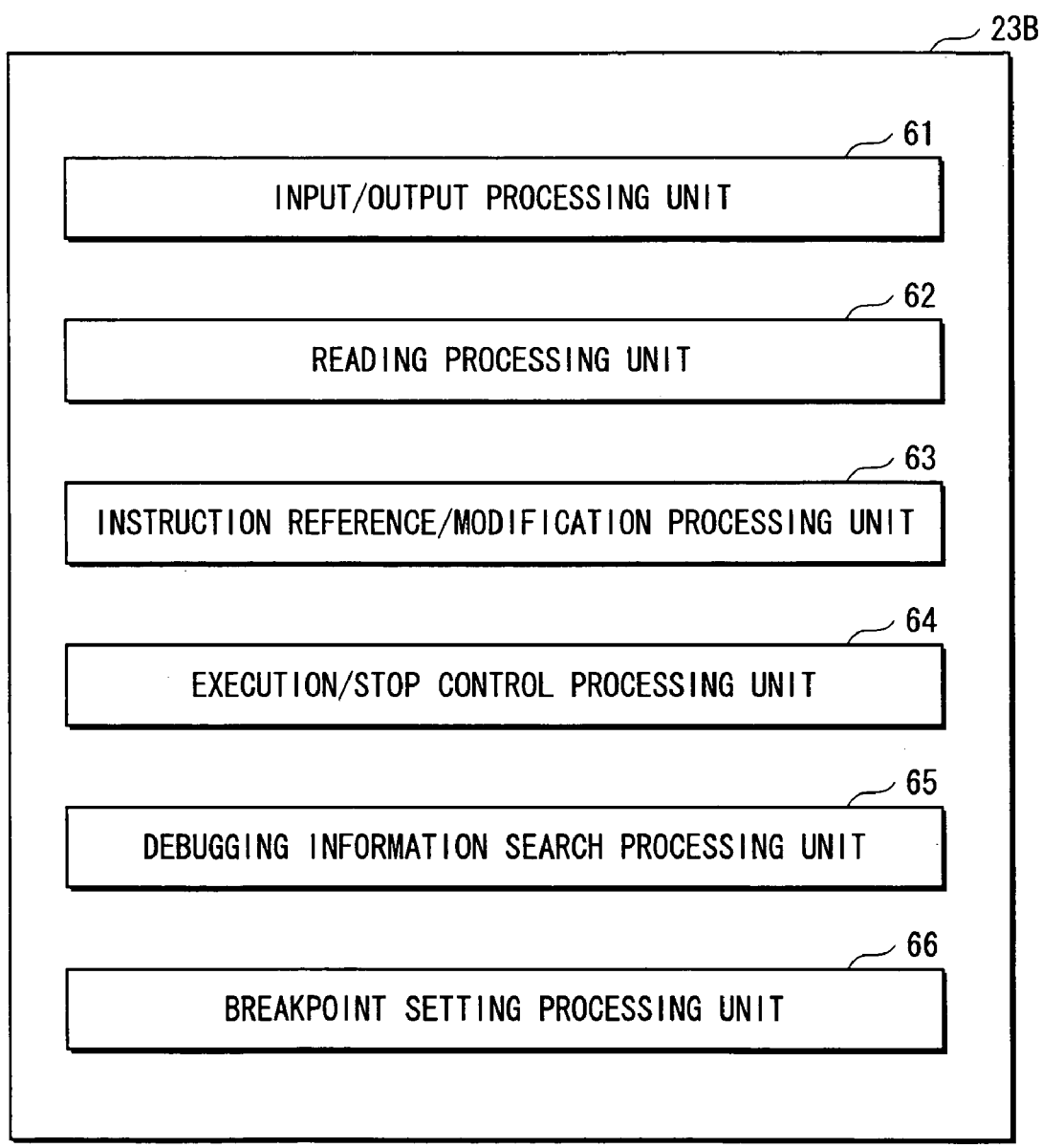
FIG. 3 is a function structural drawing showing functions of a debugging unit of FIG. 2.

The following describes functions of the debugging unit 23B of FIG. 2 with reference to FIG. 3. FIG. 3 is a function block diagram showing functions of the debugging unit 23B of FIG. 2.

The debugging unit 23B is composed of an input/output processing unit 61, a read processing unit 62, an instruction reference/modification processing unit 63, and execution/stop control processing unit 64, a debugging information search processing unit 65, and a breakpoint setting processing unit 66.

The input/output processing unit 61 performs processing including reception processing of signals from the input/output device 22, and output processing of signals to the input/output device 22.

The read processing unit 62 reads an executable program and debugging information from the storage unit 21.

The instruction reference/modification processing unit 63 references or modifies a desired instruction from the executable program and the debugging information read by the read processing unit 62, based on the contents of a signal received by the input/output processing unit 61 (contents that an operator carrying out the debugging has input using the input/output device 22).

The execution/stop control processing unit 64 causes the processor 31 to execute or stop debugging, either automatically or based on the contents of a signal received by the input/output processing unit 61 (contents that an operator carrying out the debugging has input using the input/output device 22).

The debugging information search processing unit 65 has a function of searching for a desired instruction from the debugging information, either automatically or based on the contents of a signal received by the input/output processing unit 61 (contents that an operator carrying out the debugging has input using the input/output device 22).

The breakpoint setting processing unit 66 has a function of setting a breakpoint at a particular instruction position, either automatically or based on the contents of a signal received by the input/output processing unit 61 (contents that an operator carrying out the debugging has input using the input/output device 22).

Structure of Evaluation Board 3

Figure 4:
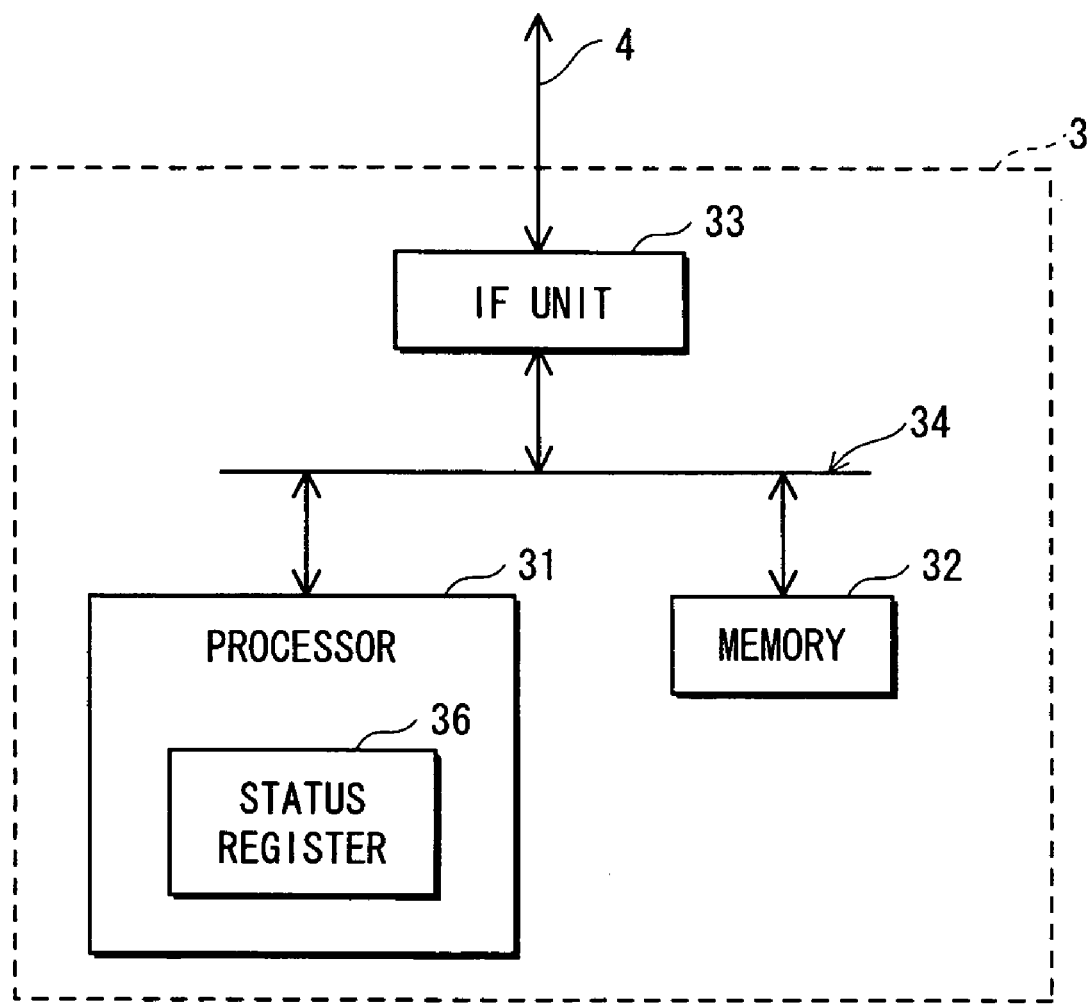
FIG. 4 is a structural drawing showing the structure of an evaluation board of FIG. 1.

The following describes the evaluation board 3 of FIG. 1 with reference to FIG. 4. FIG. 4 is a structural drawing showing the structure of the evaluation board 3 of FIG. 1.

The evaluation board 3 is composed of the processor 31, a memory 32, an IF unit 33, and a bus 34, the processor 31, the memory 32, and the IF unit 33 being connected via the bus 34.

The memory 32 stores therein an executable program that is a target of debugging, and so on.

The IF unit 33 has a function of acting as an intermediary for signals transmitted between the evaluation board 3 and the host computer 2.

A status register (flag register) 36 in the processor 31 stores therein status flags that show the satisfaction status of each of six execution conditions (described later).

The processor 31 stores in the memory 32 an executable program which is a debugging target received from the host computer 2 via the IF unit 33. Under the control of the debugging unit 23B, the processor 31 reads the executable program from the memory 32, and executes debugging of the read executable program. Upon reading a conditional break instruction during the debugging, the processor 31 refers to the status register 36 to judge whether or not the execution condition of the conditional break instruction is satisfied. The processor 31 executes interruption processing to suspend the debugging if the execution condition is judged to be satisfied, and continues debugging if the condition is judged not to be satisfied.

When the processor 31 suspends debugging, the debugging unit 23B reads values stored in the register of the processor 31 and the data stored in the memory 32 at that point in time, and outputs the read information to the input/output device 22, thus notifying the program developer of this information.

The processor 31 has an RISC (reduced instruction set computer) instruction set architecture that includes a conditional instruction in the instruction set. The basic structure of the processor 31 is the same as an ARM (advanced RISC machines) processor which is representative of RISC processors that have a conditional instruction in their instruction set.

The processor 31 differs from a conventional ARM processor in that its instruction set includes a conditional break instruction whose execution instruction is the execution instruction of a conditional instruction, and in that it executes interruption processing during debugging if the execution condition of the conditional break instruction is satisfied.

Instruction Format

32-Bit Instruction Format

The following describes a 32-bit instruction format of the processor 31 with reference to the FIG. 5. FIG. 5 shows the 32-bit instruction format of the processor 31. Note that the 32-bit instruction format of the processor 31 is basically the same as ARM code used in an ARM processor.

The four bits indicated by bit numbers 31 to 28 shown in FIG. 5 are a field showing an execution condition, and the 28 bits indicated by bit numbers 27 to 0 are a field showing an instruction. Furthermore, "cond" shows the execution condition, and each "x" shows a bit that may take a value of either "0" or "1".

For instance, "cond" being "0001" shows that the execution is "ZERO". The execution condition "ZERO" means "execute if the result of the most recently executed calculation is '0'". Furthermore, "cond" being "1110" shows that the execution condition is unconditional, in other words, that the instruction does not have an execution condition.

In the instruction set architecture of the processor 31, the following six execution conditions can be specified by a conditional instruction: "ZERO", "NZERO", "CARRY", "NCARRY", "OVER", and "NOVER".

"ZERO" is as described above, and "NZERO" is the opposite of "ZERO".

"CARRY" is an execution condition meaning "execute if a carry occurred in the result of the most recently executed calculation". "NCARRY" is the opposite of "CARRY".

"OVER" is an execution condition meaning "execute if an overflow occurred as a result of executing most recent arithmetic calculation of signed data". "NOVER" is the opposite of "OVER".

Note that the relationship between the described execution conditions is shown in FIG. 6.

32-Bit Break Instruction Format

The following describes a 32-bit break instruction format of the processor 31 with reference to FIG. 7. FIG. 7 shows the 32-bit break instruction format of the processor 31.

The four bits indicated by bit numbers 31 to 28 shown in FIG. 7 are a field showing an execution condition (the field shown as "cond" in FIG. 7), and the 28 bits indicated by bit numbers 27 to 0 are a field showing an instruction. All of the bits of bit numbers 27 to 0 have a value "1", showing that the instruction is a break instruction.

For reference purposes, FIG. 8 shows the break instruction format in the ARM code of an ARM processor. As can be seen from FIG. 8, "cond" for specifying an execution condition does not exist in the conventional break instruction format, and, obviously, an execution condition cannot be specified.

16-Bit Extension Instruction Format

An ARM processor has an extension instruction set called a 16-bit Thumb code, and, accordingly, the processor 31 also has a 16-bit extension instruction set.

The following describes the 16-bit extension instruction format of the processor 31 with reference to FIG. 9. FIG. 9 shows the 16-bit instruction format of the processor 31.

The four bits indicated by bit numbers 11 to 8 shown in FIG. 9 are a field showing an execution condition (the field shown as "cond" in FIG. 9), the four bits indicated by bit numbers 15 to 12 and the eight bits indicated by bit numbers 7 to 0 are fields showing an instruction. Each "x" shows a bit that may take a value of either "0" or "1".

16-Bit Break Instruction Format Corresponding to Extension Instructions

The following describes the 16-bit break instruction format corresponding to the extension instructions of the processor 31. FIG. 10 shows the 16-bit break instruction format corresponding to the extension instructions of the processor 31.

The four bits indicated by bit numbers 11 to 8 shown in FIG. 10 are a field showing an execution condition (the field shown as "cond" in FIG. 10), the four bits indicated by bit numbers 15 to 12 and the eight bits indicated by bit numbers 7 to 0 are fields showing an instruction. All of the bits of bit numbers 15 to 12 and 7 to 0 have a value "1", showing that the instruction is a break instruction.

For reference purposes, FIG. 11 shows the break instruction format in the Thumb code of an ARM processor. As can be seen from FIG. 11, the "cond" for specifying an execution condition does not exist in the break instruction format of the Thumb code, and, obviously, an execution condition cannot be specified.

Pipeline Processing by the Processor 31

Figure 12:
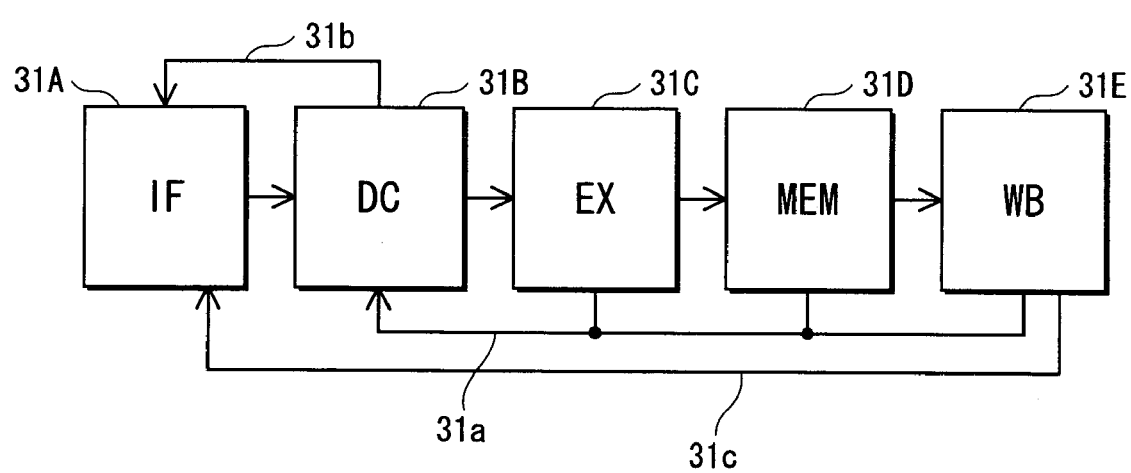
FIG. 12 shows a pipeline structure of the processor of FIG. 4.

The following describes pipeline processing by the processor 31 of FIG. 4 with reference to FIG. 12. FIG. 12 shows the pipeline structure of the processor 31.

The processor 31 has a five-stage pipeline structure. The five stages are: an IF (instruction fetch) stage 31A that fetches an instruction, which has been read from the memory 32, to an instruction buffer (not illustrated) pertaining to the processor 31; a DC (decode) stage 31B that decodes the instruction fetched to the instruction buffer; an EX (execute) stage 31C that executes the decoded instruction; a MEM (memory) stage 31D that accesses the register, the memory stack, and the like; and a WB (write back) stage 31E that writes a result of executing the instruction to the register, the memory, or the like.

When a change occurs in the value of the status flag corresponding to an execution condition according to an arbitrary instruction in any of the EX stage 31C, the MEM stage 31D and the WB stage 31E, the stage updates the value in the status register 36 and notifies (forwards) the value to the DC stage 31B according to a notification signal 31a.

The DC stage 31B judges whether or not the decoded instruction is a break instruction. If the decoded instruction is judged to be a break instruction, the DC stage 31B judges whether or not the break instruction is a conditional break instruction. If the decoded instruction is judged to be a conditional break instruction, the DC stage 31B identifies, based on the field "cond", whether the execution condition of the conditional break instruction is one of the aforementioned six execution conditions, and, based on the status flag in the status register 36, checks whether or not the identified execution condition is satisfied.

If the execution condition of the conditional break instruction is satisfied, the DC stage 31B performs exceptional registration, which is execution registration of interruption processing. If the execution condition of the conditional break instruction is not satisfied, the EX stage 31C does not execute the decoded conditional instruction.

When it has registered an exception, the DC stage 31B issues a control signal 31b to the IF stage 31A, to delete (flush) the instruction fetched to the instruction buffer.

The exception registered in the DC stage 31B is detected in the WB stage 31E which, upon detected the exception, issues an interruption vector signal 31c to the IF stage 31A, and notifies the address of the next instruction to be executed, thereby executing interruption processing.

Note that the DC stage 31B judges whether or not the decoded instruction is a break instruction based on the values of the bit numbers 27 to 0 in the case of the decoded instruction being a 32-bit instruction, and based on the value of bit numbers 15 and 12 and 7 to 0 in the case of the decoded instruction being a 16-bit instruction. Furthermore, the DC stage 31B judges whether or not the break instruction is a conditional break instruction based on bit numbers 27 to 0 in the case of the break instruction being a 32-bit instruction, and based on the bit numbers 15 to 12 and 7 to 0 in the case of the break instruction being a 16-bit instruction.

Operations

Breakpoint Setting Processing

Figure 13:
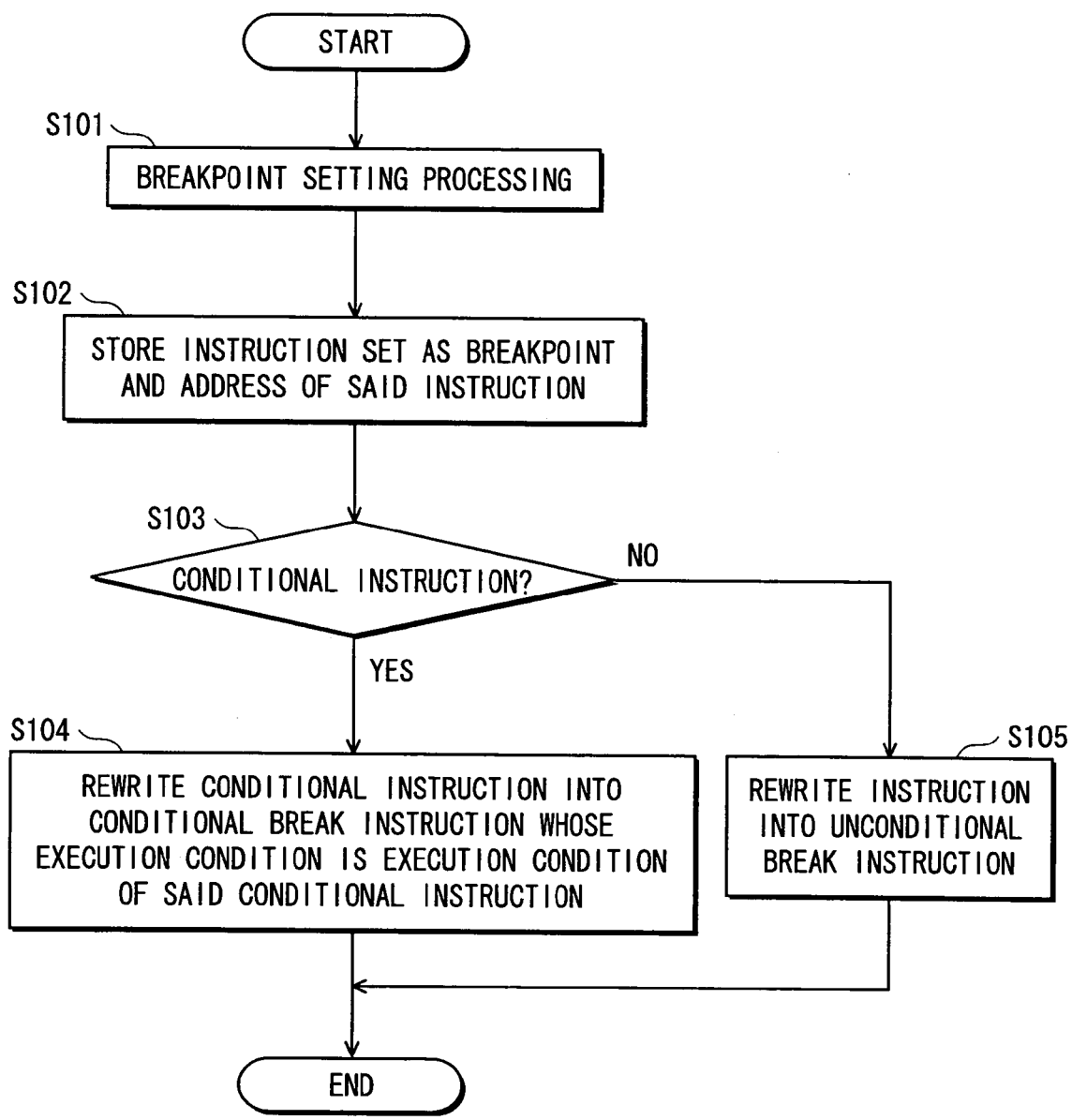
FIG. 13 is a flowchart showing operational flow of breakpoint setting processing.

Referring to FIG. 13, the following describes breakpoint setting processing performed by the breakpoint setting processing unit 66 of FIG. 3. FIG. 13 is a flowchart showing operational flow of breakpoint setting processing performed by the breakpoint setting processing unit 66.

The breakpoint setting processing unit 66 sets the position of the breakpoint (step S101), and stores therein the position (address) set as the breakpoint and the instruction of that position (step S102).

The breakpoint setting processing unit 66 judges, based on the field "cond" in the instruction of the position set as the breakpoint, whether that instruction is a conditional instruction (step S103). If the instruction of the position set as the breakpoint is judged to be a conditional instruction (step S103: YES), the breakpoint setting processing unit 66 rewrites the conditional instruction into a conditional break instruction whose execution condition is the execution condition of the conditional instruction (step S104). On the other hand, if the instruction of the position set as the breakpoint is judged not to be a conditional instruction, in other words when the instruction does not have an execution condition (step S103: NO), the breakpoint setting processing unit 66 rewrites the instruction into an unconditional break instruction that does not have an execution condition (step S105).

Step S104 and Step S105

Figure 14:
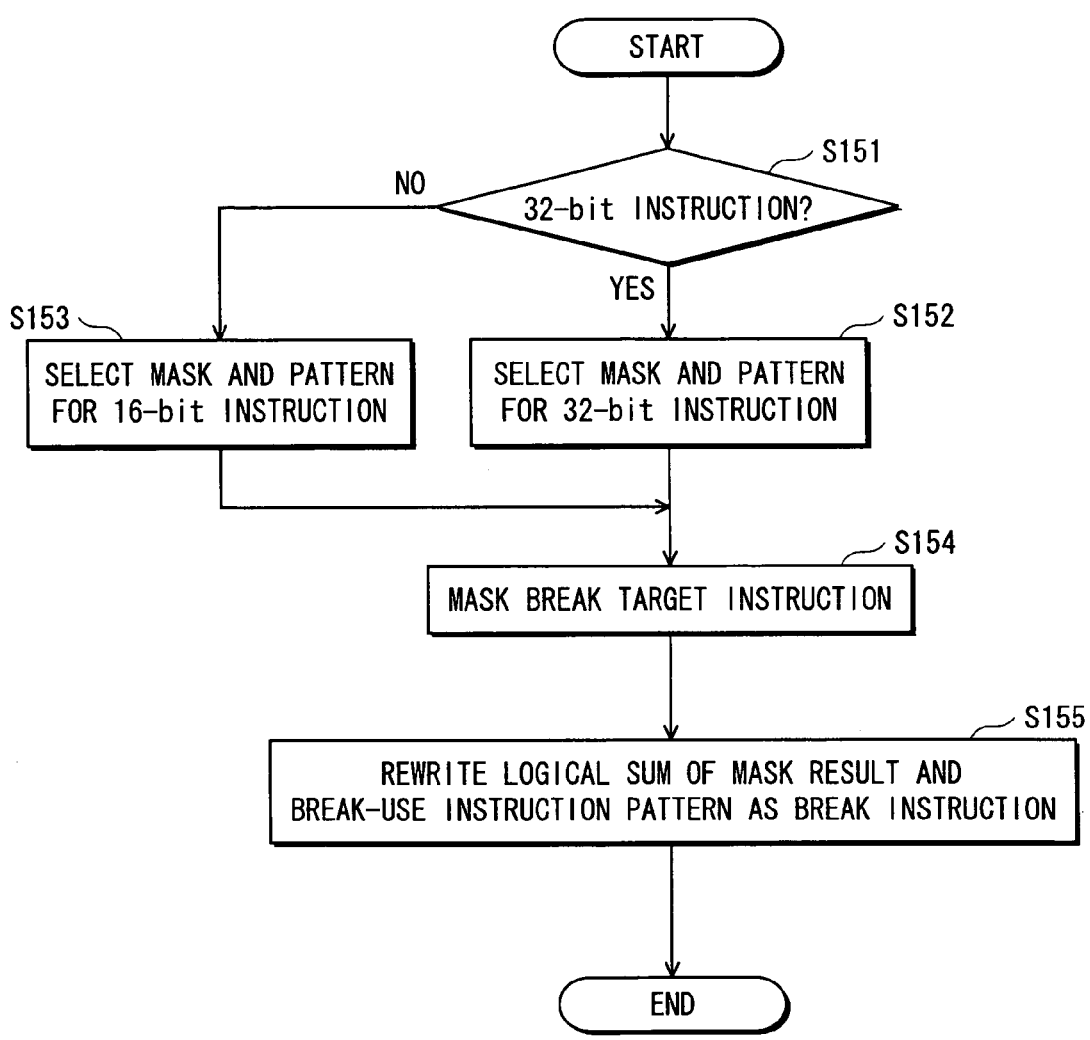
FIG. 14 is a flowchart showing operational flow of break instruction rewriting processing.

Referring to FIG. 14, the following describes break instruction rewriting processing for rewriting the instruction of the position set as the breakpoint performed at step S104 and step S105 of FIG. 13. FIG. 14 is a flowchart showing the operational flow of break instruction rewriting processing at step S104 and step S105 of FIG. 14. Note that in the present embodiment, the processing for rewriting a conditional instruction into a conditional break instruction, and the processing for rewriting an instruction that does not have a condition into an unconditional break instruction are the same algorithm.

A mask and break instruction pattern are provided respectively for both a 32-bit instruction and a 16-bit instruction, and these are stored in the storage unit 21.

In the mask for a 32-bit instruction, all of the four bits of bit numbers 31 to 28 have a value of "1", and all of the 28 bits of bit numbers 27 to 0 have a value of "0". In the break instruction pattern for a 32-bit instruction, all of the four bits of bit numbers 31 to 28 have a value of "0", and all of the 28 bits of bit numbers 27 to 0 have a value of "1".

In the mask for a 16-bit instruction, all of the four bits of bit numbers 11 to 8 have a value of "1" and all of the other bit numbers have a value of "0". In the break instruction pattern for a 16-bit instruction, all of the four bits of bit numbers 11 to 8 have a value of "0" and all of the other bit numbers have a value of "1".

The breakpoint setting processing unit 66 judges whether the instruction at the position set as the breakpoint is a 32-bit instruction or a 16-bit instruction (step S151).

If the instruction is a 32-bit instruction (step S151: YES), the breakpoint setting processing unit 66 selects the mask and break instruction pattern for the 32-bit instruction (step S152), and masks the instruction with the selected mask, in other words, finds the logical product of the instruction and the selected mask (step S154). As a result, the instruction at the position set as the breakpoint is rewritten into an instruction such that the four bits of bit numbers 31 to 28 showing the execution condition remain as is, and the 28 bits of bit numbers 27 to 0 are all "0".

Next, the breakpoint setting processing unit 66 finds the logical sum of the instruction rewritten at step S154 and the break instruction pattern, to rewrite the rewritten instruction into a break instruction (step S155). As a result, the instruction rewritten at step S154 is rewritten into a break instruction such that the four bits of bit numbers 31 to 28 showing the execution condition remain as is, and the 28 bits of bit number 27 to 0 are all "1".

If the instruction is a 16-bit instruction (step S151: NO), the break point setting processing unit 66 selects the mask and break instruction pattern for the 16-bit instruction (step S153), and masks the instruction with the selected mask, in other words, finds the logical product of the instruction and the selected mask (step S154). As a result, the instruction at the position set as the breakpoint is rewritten into an instruction such that the four bits of bit numbers 11 to 8 showing the execution condition remain as is, and all other bit numbers are "0".

Next, the breakpoint setting processing unit 66 finds the logical sum of the instruction at rewritten step S154 and the break instruction pattern, to rewrite the rewritten instruction into a break instruction (step S155). As a result, the instruction rewritten at step S154 is rewritten into a break instruction such that the four bits of bit numbers 11 to 8 showing the execution condition remain as is, and all other bit numbers are "1".

Specific Example 1 of Breakpoint Setting Processing

Referring to FIG. 15 to FIG. 17, the following describes a specific example of breakpoint setting processing when a position of a conditional instruction is set as a breakpoint. FIG. 15 shows part of the source program. FIG. 16, which corresponds to FIG. 15, shows part of debugging information that mnemonically expresses an executable program, the debugging information being generated when the source program is converted to the executable program. FIG. 17 shows part of debugging information that mnemonically expresses the executable program in which a breakpoint has been set.

FIG. 15 shows line numbers of source code, and statements expressed in C language. The source program in FIG. 15 denotes the following: "Give an argument 1 to function sub and call, substitute return value in variable r (line number 10). If the value of the variable r is 0, add 2 to the variable r (line numbers 11 to 13)."

FIG. 16 shows instruction addresses, execution conditions of instructions, and instructions expressed mnemonically. The mnemonics in FIG. 16 denote the following: "Store 1 in register R1 (address 0x80000000). Save the address of the next instruction to the stack, and branch to function sub (address 0x80000004). If the result of function sub is 0, store a value obtained by adding 2 to the value stored in the register R1, to the register R1 (address 0x80000008). If the result of the function sub is not 0, write the value of register R1 to the memory address shown by a value obtained by adding 0×10 to the value of the stack pointer (address 0x8000000C).

Furthermore, in FIG. 16, "ZERO" is specified as the execution condition of an ADD instruction of the address 0x80000008. This execution condition "ZERO" shows that the ADD instruction should be executed if the result of the function sub that is called by the directly preceding CALL instruction is "0".

FIG. 17 shows that when the position of address 0x80000008, in other words, the position of the conditional instruction specifying "ZERO", is set as a breakpoint, the breakpoint setting processing unit 66 leaves the execution condition "ZERO" of the address 0x80000008 as is, and rewrites the ADD instruction "ADD R1, 2" to a "BRK", which shows a break instruction.

Interruption Processing

Figure 18:
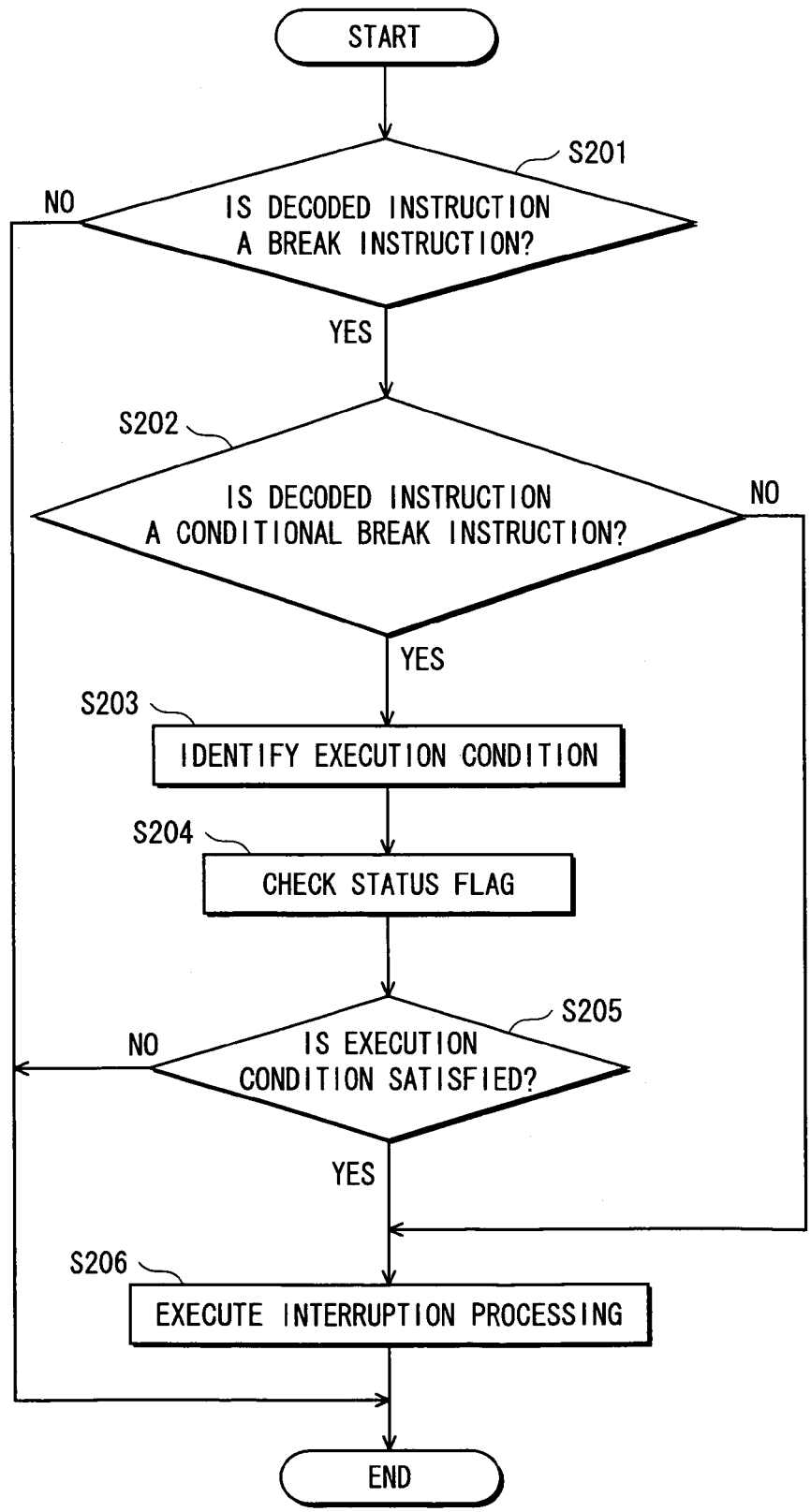
FIG. 18 is a flowchart showing operational flow of interruption processing.

Referring to FIG. 18, the following describes interruption processing performed by the processor 31 of FIG. 4 during execution of debugging. FIG. 18 is a flowchart showing interruption processing performed by the processor 31 during execution of debugging.

During execution of debugging, the DC stage 31B of the processor 31 judges whether or not the decoded instruction is a break instruction (step S201). If the decoded instruction is not a break instruction (step S201: NO), the EX stage 31C does not perform interruption processing. On the other hand, if the decoded instruction is a break instruction (step S201: YES), the DC stage 31B judges whether or not the break instruction is a conditional break instruction (step S202).

If the instruction is not a conditional break instruction, in other words, if the instruction is an unconditional break instruction (step S202: NO), the DC stage 31B performs exception registration which involves the IF stage 31A flushing the instruction stored in the instruction buffer, and the EX stage 31C executing interrupt processing (step S206).

On the other hand, if the instruction is a conditional break instruction (step S202: YES), the DC stage 31B identifies whether the execution condition of the conditional break instruction is one of the six above-described execution instructions (step S203). Next, the DC stage 31B refers to the status register 36, to check the status flag of the identified and obtained execution condition (step S204), and judges whether or not the execution condition is satisfied (step S205). If the execution condition is not satisfied (step S205: YES), the DC stage 31B performs exception registration which involves the IF stage 31A flushing the instruction stored in the instruction buffer, and the EX stage 31C executing interrupt processing (step S206). On the other hand, if the execution condition is not satisfied (step S205: NO), the EX stage 31C does not perform interruption processing.

Effects

As has been described, by using the processor 31, and the host computer 2 that performs breakpoint setting processing, the time required to execute debugging can be reduced because the need for a debugging device to perform a simulation, such as with a conventional interruption control method, is eliminated. Therefore, debugging can be performed effectively.

Modifications

The present invention is not limited to the described embodiment. Cases such as the following are included in the present invention.

Predictability Judgment Processing

When the instruction at a position to be made a breakpoint (for instance, a position specified by the user as a breakpoint) is a conditional instruction, the debugging unit 23B may perform processing to predict whether or not the execution condition of the conditional instruction will be satisfied during debugging. If this is not predictable, the debugging unit 23B notifies the user to that effect.

Figure 19:
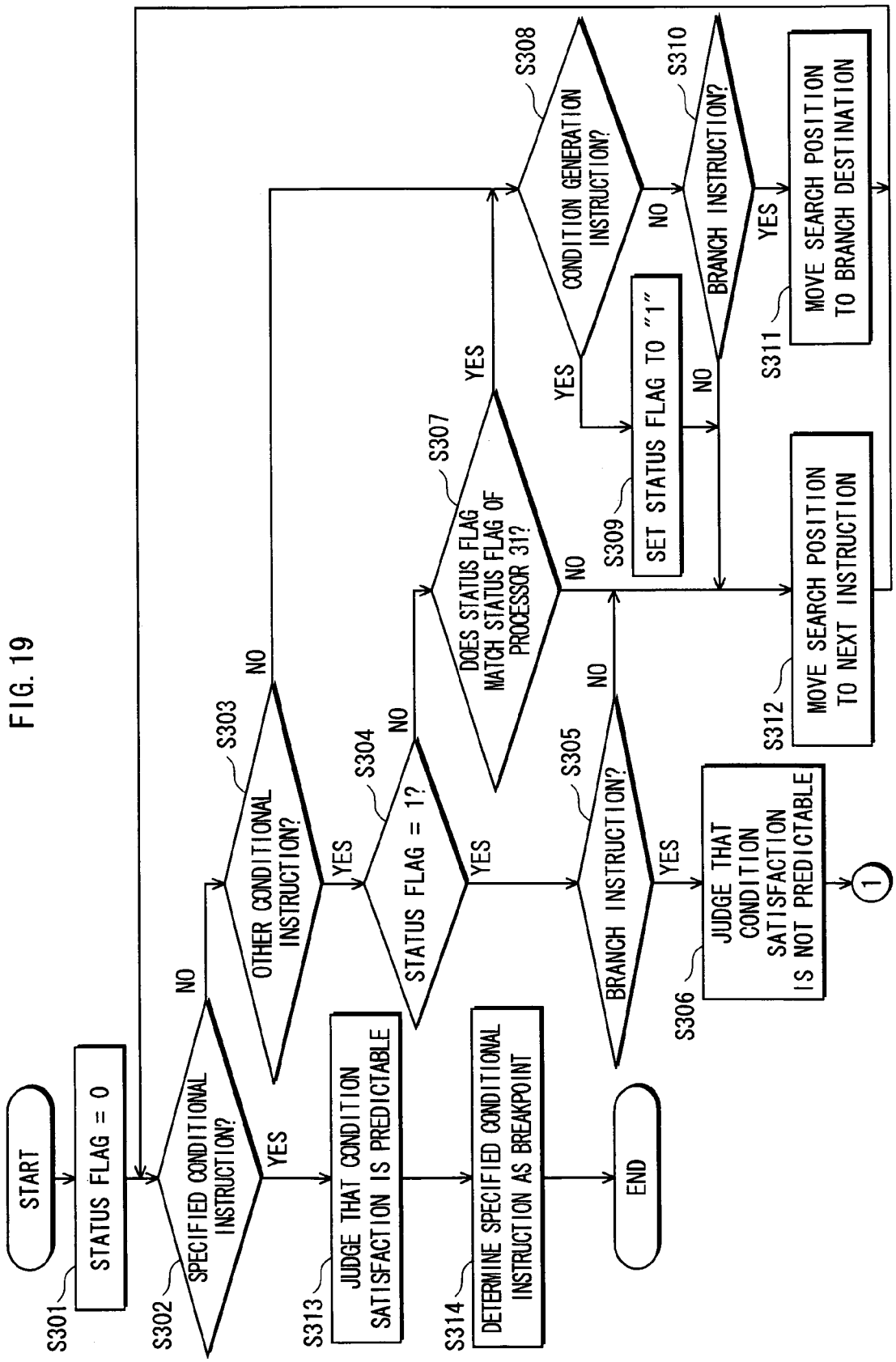
FIG. 19 is a flowchart showing operational flow of predictability judgment processing.

FIG. 19 is a flowchart showing operational flow of predictability judgment processing in which, in the case of the instruction at the position to be set as a breakpoint is a conditional instruction, the debugging unit 23B judges whether or not it can be predicted whether the execution condition of the conditional instruction will be satisfied during execution of debugging. Note that the predictability judgment processing is performed based on the debugging information stored in the storage unit 21.

The debugging information search processing unit 65 sets to "0" a status flag showing status change of the execution condition of the conditional instruction at the position to be set as a breakpoint (step S301).

Next, the debugging information search processing unit 65 reads the instruction at the debugging execution start position that is a search start position, and judges whether or not the read instruction is a conditional instruction that is specified as a position to be a breakpoint (step S302). If so (step S302: YES), the debugging information search processing unit 65 proceeds to step S313, and if not (step S302: NO), the debugging information search processing unit 65 proceeds to step S303.

The debugging information search processing unit 65 judges whether or not the instruction at the search position is a so-called "second conditional instruction" that has a different execution condition to the execution condition of the conditional instruction at the position that is to be a breakpoint (step S303).

If the instruction at the search position is not a second conditional instruction (step S303: NO), the debugging information search processing unit 65 proceeds to step S308.

If the instruction at the search position is a second conditional instruction (step S303: YES), the debugging information search processing unit 65 checks whether or not the status flag showing the status change of the execution condition of the second conditional instruction is "1" (step S304).

If the status flag of the execution condition of the second conditional instruction is "1" (step S304: YES), the debugging information search processing unit 65 checks whether or not the second conditional instruction is a branch instruction (step S305).

If the second conditional instruction is a branch instruction (step S305: YES), the debugging information search processing unit 65 judges whether or not satisfaction of the execution condition of the conditional instruction at the position to be set as a breakpoint can be predicted (step S306). Based on a judgment of "non predictability" by the debugging information search processing unit 65, the input/output processing unit 61 performs output processing to notify the user to that effect, and this notification is displayed on the display of the input/output device 22.

If the second conditional instruction is not a branch instruction (step S305: NO), the debugging information search processing unit 65 proceeds to the processing at step S312.

If the status flag of the execution condition of the second conditional instruction is not "1" (step S304: NO), the debugging information search processing unit 65 judges whether or not the status flag of the second conditional instruction matches the status flag of that execution condition in the status register 36 of the processor 31 (step S307). If the two match (step S307: YES), the debugging information search processing unit 65 proceeds to the processing at step S308, and if the two do not match (step S307: NO), the debugging information search processing unit 65 proceeds to the processing at step S312.

At step S308, the debugging information search processing unit 65 checks whether or not the instruction at the search position is an instruction that effects the execution condition of any conditional instruction (step S308). Note that hereinafter, an instruction that effects the execution condition of a conditional instruction is referred to as a "condition generation instruction"

If the instruction at the search position is a condition generation instruction (step S308: YES), the debugging information search processing unit 65 sets the status flag of the execution condition that is affected by the condition generation instruction to "1" (step S309), and proceeds to the processing at step S312.

If the instruction at the search position is not a condition generation instruction (step S308: NO), the debugging information search processing unit 65 checks whether or not the instruction at the search position is a branch instruction (step S310). If the instruction at the search position is a branch instruction (step S310: YES), the debugging information search unit 65 moves the search position to the branch destination (step S311), and proceeds to the processing at step S302. If the instruction at the search position is not a branch instruction (step S310: NO), the debugging information search processing unit 65 proceeds to the processing at step S312.

At step S312, the debugging information search processing unit 65 moves the search position to the next instruction (step S312), and proceeds to the processing at step S302.

At step S313, the debugging information search processing unit 65 judges whether or not satisfaction of the execution condition of the conditional instruction at the position to be the breakpoint is able to be predicted (step S313), and the breakpoint setting processing unit 66 sets, according to the judgment result, the position of the specified conditional instruction as a breakpoint (step S314). Subsequently, the breakpoint setting processing unit 66 proceeds to the processing of step S102 shown in FIG. 13.

Search Processing 1

At step S306 of the described predictability judgment processing, when the debugging information search processing unit 65 judges that satisfaction of the execution condition of the conditional instruction at the position to be the breakpoint is not predictable, the debugging information search processing unit 65 may perform the following processing. Specifically, the debugging information search processing unit 65 may detect an instruction that is in a closest position to the conditional instruction, from among second conditional instructions and unconditional instructions in positions subsequent to the conditional instruction at the position to be the breakpoint. The debugging information search processing unit 65 may then set both the position of the conditional instruction and the position of the detected instruction as reserve breakpoints.

Figure 20:
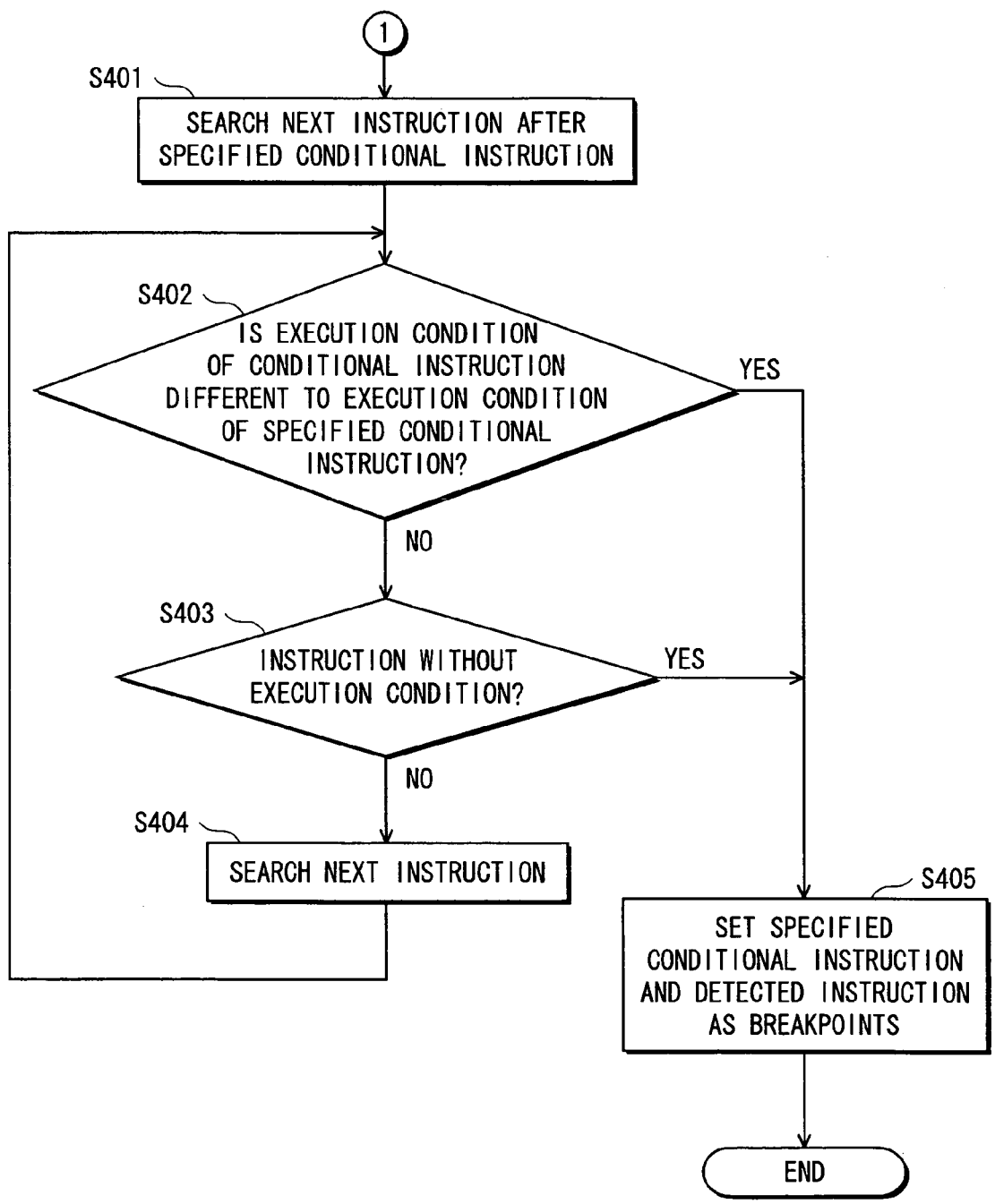
FIG. 20 is a flowchart showing operational flow of search processing for searching for a reserve breakpoint.

FIG. 20 is a flowchart showing operational processing of search processing performed by the debugging unit 23B for searching for a reserve breakpoint. Note that the search processing is performed based on the debugging information stored in the storage unit 21.

If at step S306 of FIG. 19 the debugging information search processing unit 65 judges that satisfaction of the execution condition of the conditional instruction at the position to be the breakpoint is not predictable, the debugging information search processing unit 65 searches for the next instruction after the specified conditional instruction (step S401).

The debugging information search processing unit 65 judges whether or not the instruction at the search position is a conditional instruction having a different execution condition to the execution condition of the specified conditional instruction that is to be the breakpoint (step S402).

If the instruction at the search position is a conditional instruction having a different execution condition to the execution condition of the specified conditional instruction that is to be the breakpoint (step S402: YES), the breakpoint setting processing unit 66 sets both the specified conditional instruction and the instruction at the search position as breakpoints (step S405). The breakpoint setting processing unit 66 then proceeds to the processing at step S102 shown in FIG. 13.

If the instruction at the search position is not a conditional instruction having a different execution condition to the specified conditional instruction that is to be the breakpoint (step S402: NO), the debugging information search processing unit 65 checks whether or not the instruction at the search position is an unconditional instruction (step S403).

If the instruction at the search position is an unconditional instruction (step S403: YES), the breakpoint setting processing unit 66 sets both the specified conditional instruction and the instruction at the detection position as breakpoints (step S405). The breakpoint setting processing unit 66 then proceeds to the processing at step S102 shown in FIG. 13.

If the instruction at the search position is not an unconditional instruction (step S403: NO), the debugging information search processing unit 65 searches the next instruction (step S404), and returns to the processing at step S402.

Search Processing 2

When debugging a sub-routine, if a position of a conditional instruction in the sub-routine is set as a breakpoint, the following search processing may be performed instead of the described predictability judgment processing, to set one or more candidates for a reserve breakpoint.

Figure 21:
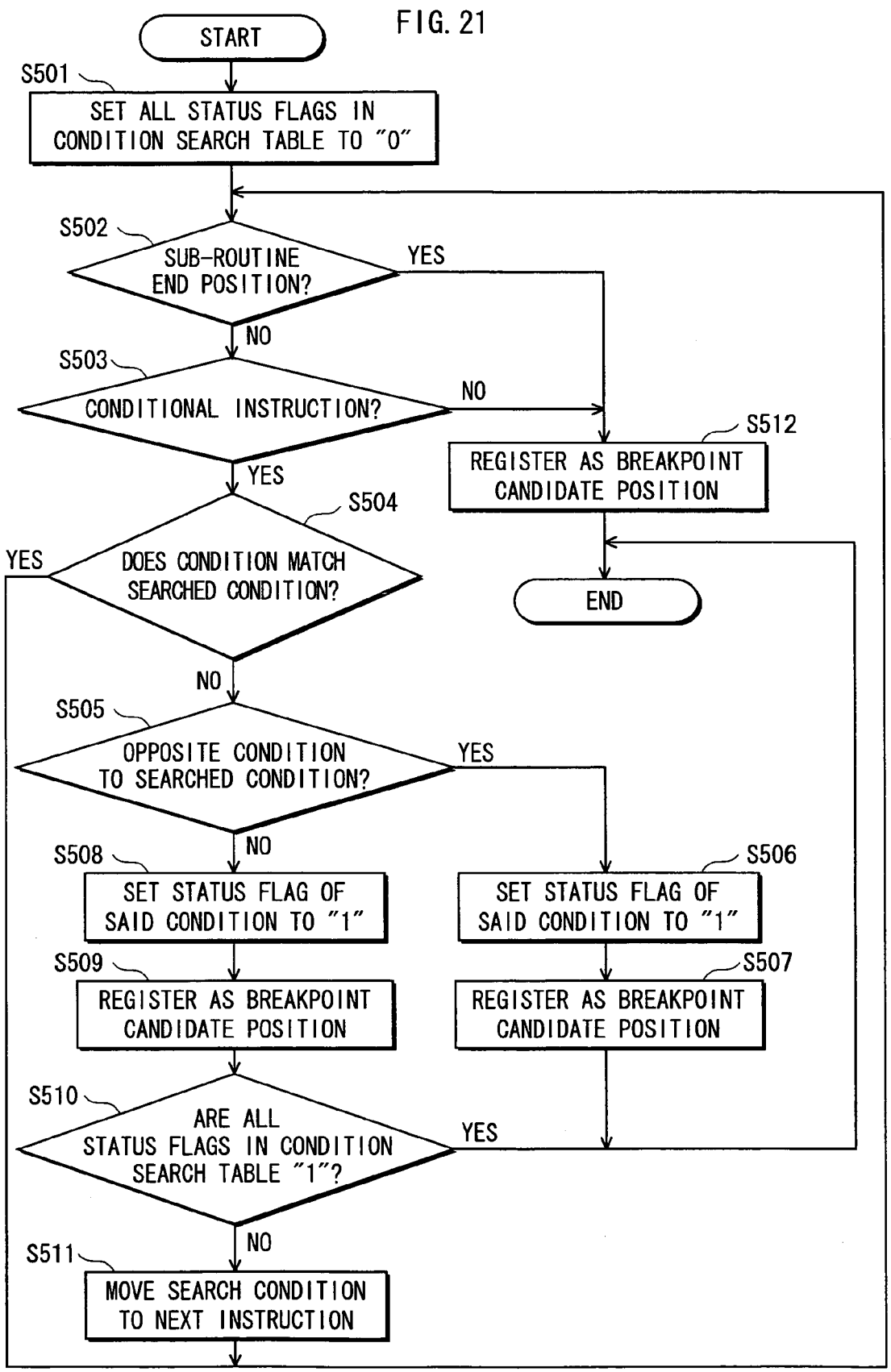
FIG. 21 is a flowchart showing operation flow of search processing for searching for a reserve breakpoint.

FIG. 21 is a flowchart showing operational flow of search processing performed by the debugging unit 23B to set one or more candidates for a reserve breakpoint. Note that the search processing is performed based on the debugging information stored in the storage unit 21.

The storage unit 21 stores a condition search table for use in the search processing of FIG. 21. The condition search table is composed of pairs of a condition (execution condition) and a flag (status flag) of the condition, an example thereof being shown in FIG. 22. Each of the execution conditions in the condition search table in FIG. 22 has an opposite condition. Note that the condition search table is not limited to including opposite conditions of the execution conditions as execution conditions.

The debugging information search processing unit 65 sets the status flag of each execution condition shown in the condition search table, and starts searching with the search start position being the next instruction after specified conditional instruction (step S501).

The debugging information search processing unit 65 judges whether or not the search position is the end position of the sub-routine (step S502). If the search position is the end position of the sub-routine (step S502: YES), the debugging information search processing unit 65 registers the end position of the sub-routine as a breakpoint candidate position (step S512), and end the processing. If the search position is not the end position of the sub-routine (step S502: NO), the debugging information search processing unit 65 judges whether or not the instruction at the search position is a conditional instruction (step S503).

If the instruction at the search position is not a conditional instruction, in other words, is an unconditional instruction (step S503: NO), the debugging information search processing unit 65 registers the position of the unconditional instruction as a breakpoint candidate position (step S512), and ends the processing. If the instruction at the search position is a conditional instruction (step S503: YES), the debugging information search processing unit 65 judges, based on the condition search table, whether or not the execution condition of the of the conditional instruction at the search position is identical to the execution condition of a previously found conditional instruction (step S504).

If the execution condition of the of the conditional instruction at the search position is identical to the execution condition of a previously found conditional instruction (step S504: YES), the debugging information processing unit 65 moves the search position to the next instruction (step S511). If the execution condition of the conditional instruction at the search position is not identical to the execution condition of a previously found conditional instruction (step S504: NO), the debugging information search processing unit 65 judges, based on the condition search table, whether or not the execution condition of the conditional instruction at the search position is the opposite condition to the execution condition of a previously found conditional instruction (step S505).

If the execution condition of the conditional instruction at the search position is the opposite condition to the execution condition of a previously found conditional instruction (step S505: YES), the debugging information search processing unit 65 sets the status flag of the execution condition of the conditional instruction at the search position to "1" in the condition search table (step S506). Next, the debugging information search processing unit 65 registers the conditional instruction position at the search position as a breakpoint candidate position (step S507), and ends the processing.

If the execution condition of the conditional instruction at the search position is not the opposite condition to the execution condition of a previously found conditional instruction (step S505: NO), the debugging information search processing unit 65 sets the status flag of the execution condition of the conditional instruction of the search position to "1" in the condition search table (step S508). Next, the debugging information search processing unit 65 registers the conditional instruction position of the search position as a breakpoint candidate position (step S509). The debugging information search processing unit 65 then judges whether or not all the status flags in the condition search table are "1" (step S510).

If all the status flags in the condition search table are "1" (step S510: YES), the processing ends. If all the status flags in the condition search table are not "1" (step S510: NO), the debugging information search processing unit 65 moves the search position to the next instruction (step S511).

At step S101 of FIG. 13, the breakpoint setting processing unit 65 sets as a breakpoint at least one of positions registered as breakpoint candidate positions in the above processing.

Specific Example 2 of Breakpoint Setting Processing

The following describes a specific example of breakpoint setting processing for, when executing debugging of a sub-routine, setting a position of a conditional instruction in the sub-routine as a breakpoint to ensure that debugging of the sub-routine is stopped.

FIG. 23 shows part of a sub-routine in a source program. FIG. 24, which corresponds to FIG. 23, shows part of debugging information that mnemonically expresses an executable program, the debugging information being generated when the source program is converted to the executable program. FIG. 25 shows part of debugging information that mnemonically expresses an executable program in which a breakpoint has been set.

FIG. 23 shows line numbers of source code, and statements expressed in C language. The source program in FIG. 23 denotes the following: "Give an argument 1 to function sub and call, substitute return value in variable r (line number 110). If the value of the variable r is 0, return to the main program (line numbers 11 to 13)."

FIG. 24 shows instruction addresses, execution conditions of instructions, and instructions expressed mnemonically. The mnemonics in FIG. 24 denote the following: "Store 1 in register R1 (address 0x80000000). Save the address of the next instruction to the stack, and branch to function sub (address 0x80000004). If the result of function sub is 0, set return address from stack pointer in program counter, and restore main program (address 0x0000008). If the result of the function sub is not 0, write the value of register R1 to the memory of the address shown by a value obtained by adding 0×10 to the value of the stack pointer (address 0x8000000C).

In FIG. 24, if the position of the address 0x80000008, in other words, the position of a conditional instruction specifying "ZERO", is set as a breakpoint, the breakpoint setting processing unit 66, as shown in FIG. 25, leaves the execution condition "ZERO" of the address 0x80000008 as is, and rewrites the return instruction "RET" to "BRK", which shows a break instruction. In addition, the breakpoint setting processing unit 66 rewrites the move instruction "MOV(SP+ 0x10) of the address 0x8000000C that is subsequent to the return instruction and was detected in the processing, to "BRK", which shows a break instruction.

Supplementary Remarks (1) The present invention may be a debugging device that performs the described breakpoint setting processing, or may be a debugger or a breakpoint setting method.

(2) Although an RISC processor is described in the above embodiment, the present invention may be applied to a CISC (complex instruction set computer) processor.

(3) Although the processor 31 is described as being installed in the evaluation board 3, the processor 31 may be provided in the host computer 2. Furthermore, instead of the processor 31, an emulator that emulates the processor 31 may be provided in the evaluation board 3 and the host computer 2, and the emulator may execute debugging of the executable program that is the target of debugging. Furthermore, a simulator that simulates the operations of the processor 31 may be included in the host computer 2 as program, instead of the processor 31. Furthermore, a system that includes a simulation program that simulates the operations of the processor 31 may be used instead. of the evaluation board 3.

(4) Although in the above embodiment the processor 31 is described as having two instruction formats, specifically 32-bit and 16-bit instructions, the processor 31 may have a single instruction format or three or more instruction formats. Furthermore, although the description of the instruction formats limits the position of "cond" that shows the execution condition, the instruction format may be one that specifies the execution condition at a position other than the described positions.

(5) When applying the present invention to a processor that is capable of freely executing instructions of different lengths, a break instruction of the length of the shortest instruction that has an execution condition (16 bits in the preferred embodiment of the present invention) may be provided, and this may be used to substitute for break instructions.

(6) For the sake of simplicity of explanation in the above embodiment, part of the bits in the instruction format are described as showing an execution condition. However, the essence of the present invention is setting the execution condition of a break instruction to be identical to the execution condition of an instruction replaced by the break instruction. For instance, it is sufficient that the execution condition can be specified, even if the bits showing the execution condition are not in a specific position in the instruction format. Furthermore, it is sufficient for the execution condition of an instruction replaced with a break instruction to be easily identifiable, and for an identical execution condition to be set in the break instruction.

(7) Although the processor 31 is described in the embodiment as having a five-stage structure, the number of stages in the pipeline may be a number other than five. Furthermore, it is not imperative that the processor 31 has a pipeline structure.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

INDUSTRIAL APPLICABILITY

The present invention is effective in debugging performed in software development.

What is claimed is:

1. An instruction execution device that executes instructions stored in a storage device, comprising:
a storage unit operable to store a value that is an instruction execution result;
an execution unit operable to execute a debug instruction that interrupts instruction execution;

an identification unit operable to identify, from a bit sequence that constitutes the debug instruction, a conditional expression that uses, as an operand, the value stored in the storage unit; and a judgment unit operable to judge whether or not the identified conditional expression is true or false, by referring to the value stored in the storage unit, wherein the execution unit suppresses execution of the debug instruction when the conditional expression is judged to be false.

2. The instruction execution device of claim 1, wherein the debug instruction is shorter in length than an instruction that is shortest in length among instructions in an instruction set of the instruction execution device.

3. A debugging method that sets a breakpoint in a program that can be decoded and executed by the instruction execution device of claim 1, the method comprising:

judging whether or not an instruction at a position that has been set as the breakpoint is a conditional instruction; and when the instruction at the position that has been set as the breakpoint is judged to be a conditional instruction, rewriting the conditional instruction into a debug instruction that specifies an execution condition that is identical to an execution condition of the conditional instruction.

* * * * *

UNITED STATES PATENT AND TRADEMARK OFFICE
CERTIFICATE OF CORRECTION

PATENT NO. : 7,620,802 B2  Page 1 of 1
APPLICATION NO. : 11/440253
DATED : November 17, 2009
INVENTOR(S) : Takuma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twenty-sixth Day of October, 2010

David J. Kappos
*Director of the United States Patent and Trademark Office*